United States Patent
Chen et al.

(10) Patent No.: US 8,090,455 B2
(45) Date of Patent: Jan. 3, 2012

(54) MOTION CONTROL SERVO LOOP APPARATUS

(75) Inventors: Ying-Min Chen, Hsinchu County (TW); Wen-Chuan Chen, Hsinchu (TW); Jing-Yi Huang, Taoyuan County (TW); Cheng-Xue Wu, Kaohsiung (TW); Chia-Ching Lin, Tainan (TW); Wan-Kai Shen, Taipei (TW)

(73) Assignee: Industrial Technology Research Institute, Hsin-Chu (TW)

( * ) Notice: Subject to any disclaimer, the term of this patent is extended or adjusted under 35 U.S.C. 154(b) by 445 days.

(21) Appl. No.: 12/466,912

(22) Filed: May 15, 2009

(65) Prior Publication Data
US 2010/0152868 A1    Jun. 17, 2010

(30) Foreign Application Priority Data
Dec. 17, 2008 (TW) .............................. 97149096 A

(51) Int. Cl.
*G06F 19/00* (2011.01)
(52) U.S. Cl. .............. 700/42; 700/29; 700/78; 318/561; 318/615; 318/696
(58) Field of Classification Search .................... 700/29, 700/37, 42, 78, 187; 318/561, 608, 615, 318/696
See application file for complete search history.

(56) References Cited

U.S. PATENT DOCUMENTS

| 4,893,068 A * | 1/1990 | Evans, Jr. | 318/615 |
| 6,191,543 B1 * | 2/2001 | Lai et al. | 318/34 |
| 7,606,624 B2 * | 10/2009 | Cullen | 700/29 |
| 7,792,604 B2 * | 9/2010 | Hong et al. | 700/188 |
| 2010/0090380 A1 * | 4/2010 | Hallamasek | 267/136 |

\* cited by examiner

*Primary Examiner* — Albert Decady
*Assistant Examiner* — Douglas Lee
(74) *Attorney, Agent, or Firm* — WPAT., P.C.; Justin King

(57) ABSTRACT

A motion control servo loop apparatus, comprising: a feed-forward control module, and a proportional-integral-derivative (PID) control loop and a compensation adder. The feed-forward control module is capable of generating a feed-forward compensation. The PID control loop further comprises: a proportional control module, an integral control module and a derivative control module. The proportional control module is capable of generating a proportional compensation. The derivative control module is capable of generating a derivative compensation. The integral control module uses a digital differential analyzer (DDA) algorithm to perform integration for accumulated errors with respect to each sampling clock at each DDA pulse and thus output an accumulated error, which is then processed to generate an integral compensation. Thereafter, the compensation adder receives the feed-forward compensation, the proportional compensation, the integral compensation and the derivative compensation to calculate a position error compensation for a motor driver.

3 Claims, 3 Drawing Sheets

MOTION CONTROL SERVO LOOP APPARATUS

FIELD OF THE INVENTION

The present invention generally relates to a motion control servo loop apparatus and, more particularly, to a motion control servo loop apparatus comprising a proportional-integral-derivative (PID) control loop having an integral control module using a digital differential analyzer (DDA) algorithm to enhance the response speed, eliminate the steady-state error, improve the transient response and compensate the delay of a controlled system.

BACKGROUND OF THE INVENTION

Motion control is a common fundamental technology for all machine controllers to control the speed, position and torque of a motor used on various machines for driving cutting tools or chucks in the 3-D space to perform cutting, manufacturing, assembly, fetching and other automated motions along an expected trajectory with expected speed at expected time. There are two types of conventional motion control servo loop: open-loop control, and closed loop control using proportional-integral-derivative (PID) control.

Open-loop control is performed by a pulse generator outputting position commands inside a controller without a feedback signal for comparison and error calculation. Therefore, it fails to improve system performance such as the response speed and the steady-state error, and is only suitable for low-end control.

On the other hand, the proportional-integral-derivative (PID) control loop matches with the feed-forward controller to provide proportional, integral and derivative calculations. The proportional controller is a constant gain controller using a feedback signal to correct errors and enhance the response speed. The derivative controller is capable of differentiating the error with respect to time so as to improve the transient response. The integral controller is capable of integrating the error so as to eliminate the steady-state error as the system reaches the steady state. However, even though the integral control loop is capable of eliminating the steady-state error, the response speed is lowered. Therefore, it fails to respond to the change in the system in real-time. If the parameters such as the integral gain and the integral time are set too large, the controlled system will be unstable due to oscillation caused by rapidly increased accumulated error. The servo significantly lags under high speed control, which causes slow response, affects the tracking accuracy and is not useful in high precision control.

Accordingly, in order to meet the requirement of high speed and high precision of a high-end motion controller, the currently available motion control servo loop has to be improved so as to enhance the control performance and overcome the aforesaid problems regarding accuracy and stability.

SUMMARY OF THE INVENTION

In view of the above, the present invention provides a motion control servo loop apparatus comprising a proportional-integral-derivative (PID) control loop having an integral control module using a digital differential analyzer (DDA) algorithm to enhance the response speed, eliminate the steady-state error, improve the transient response and compensate the delay of a controlled system.

In order to achieve the foregoing object, the present invention provides a motion control servo loop apparatus, comprising: a feed-forward control module, and a proportional-integral-derivative (PID) control loop and a compensation adder. The feed-forward control module is capable of generating a feed-forward compensation. The PID control loop further comprises: a proportional control module, an integral control module and a derivative control module. The proportional control module is capable of generating a proportional compensation. The derivative control module is capable of generating a derivative compensation. The integral control module uses a digital differential analyzer (DDA) algorithm to perform integration for accumulated errors with respect to each sampling clock at each DDA pulse and thus output an accumulated error, which is then processed to generate an integral compensation. Thereafter, the compensation adder receives the feed-forward compensation, the proportional compensation, the integral compensation and the derivative compensation to calculate a position error compensation for a motor driver.

BRIEF DESCRIPTION OF THE DRAWINGS

The objects and spirits of the embodiments of the present invention will be readily understood by the accompanying drawings and detailed descriptions, wherein.

DETAILED DESCRIPTION OF THE PREFERRED EMBODIMENT

The present invention can be exemplified by but not limited to the preferred embodiment as described hereinafter.

Figure 1:
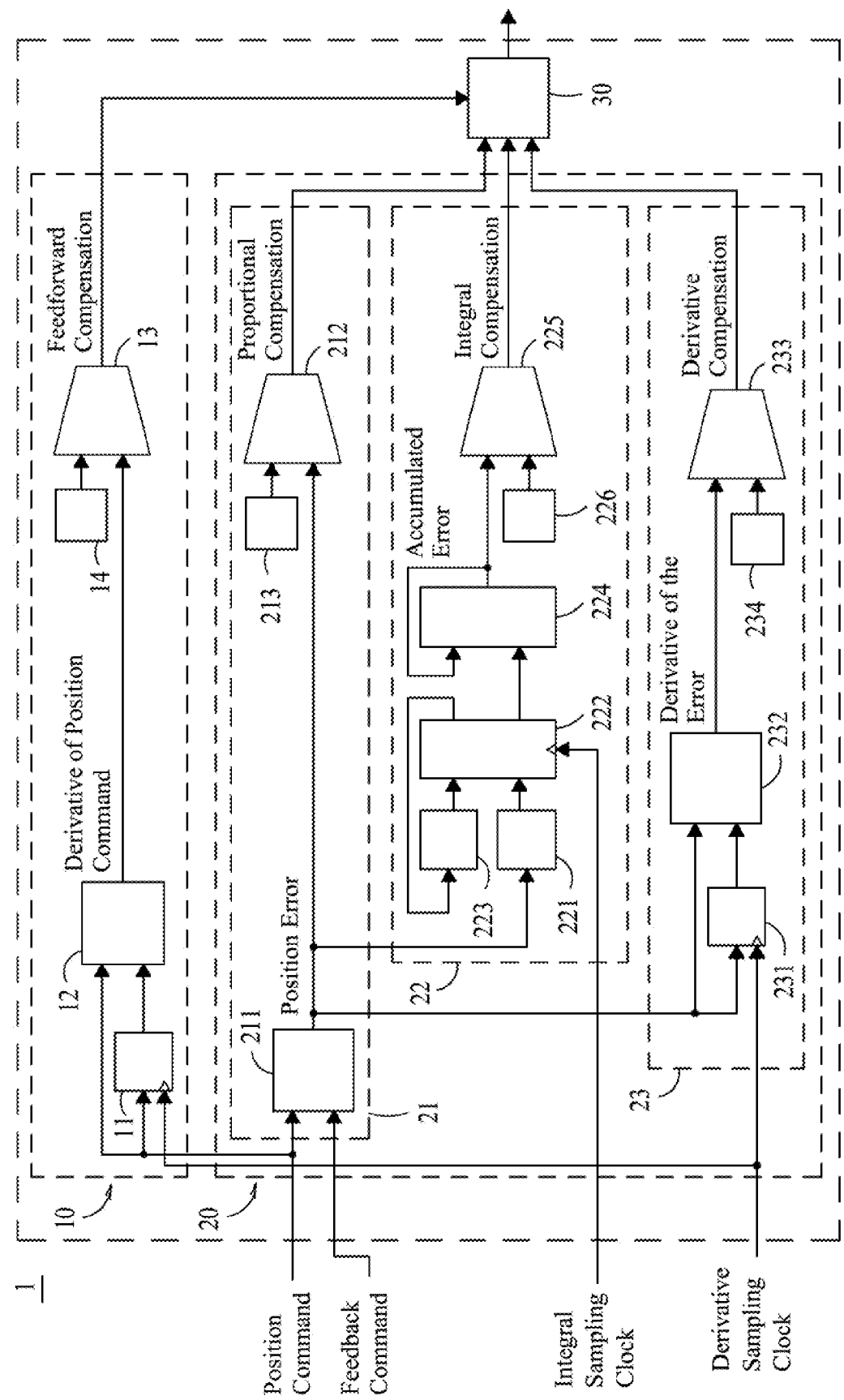
FIG. 1 is a schematic diagram of a motion control servo loop apparatus according to the present invention.

Please refer to FIG. 1, which is a schematic diagram of a motion control servo loop apparatus according to the present invention. The motion control servo loop apparatus comprises a feed-forward control module 10, a proportional-integral-derivative (PID) control loop 20 and a compensation adder 30.

The feed-forward control module 10 uses a register 11 and a subtractor 12 to differentiate a position command and generate a derivative of position command, which is multiplied with a feed-forward gain coefficient 14 by a multiplier 13 to generate a feed-forward compensation. The feed-forward compensation is then input into the compensation adder 30. The feed-forward control module 10 differentiates the position command, which is corrected by the feed-forward controller before the target signal is input into a motor driver (not shown), so that the signal input into the compensation adder 30 leads the previously determined target command to compensate the lag of the controlled system, reduce the tracking error due to the change of speed and increase the tracking accuracy of the controlled systems.

The proportional-integral-derivative (PID) control loop 20 comprises a proportional control module 21, an integral control module 22 and a derivative control module 23.

The proportional control module 21 uses an error counter 211 to receive the position command and the feedback command generated by a motor encoder and subtract the feedback command from the position command to obtain a position error, which is multiplied with a proportional gain 213 by a multiplier 212 to generate a proportional compensation. The proportional compensation is input into the compensation adder 30 to shorten the response time.

The integral control module 22 comprises an error command register 221, an adder 222, an error accumulator 224 and a remainder register 223. The integral sampling frequency is the inverse of the period of integral time. The position error is input into the error command register 221. The adder 222 uses a digital differential analyzer (DDA) algorithm to perform integration for accumulated errors with respect to each sampling clock at each DDA pulse. The sum of the values in the error command register 221 and remainder register 223 is then compared with the number of the total clocks within the integral time. If overflow happens, an overflow signal is output to trigger the error accumulator 224 to perform error accumulation and store the compared result in the remainder register 223. The error accumulator 224 outputs an accumulated error during each integral time. The accumulated error is then multiplied with an integral gain 226 by a multiplier 225 to generate an integral compensation, which is input into the compensation adder 30.

The compensation adder 30 is capable of calculating the position error compensation for a motor driver according to the received feed-forward compensation, proportional compensation, integral compensation and derivative compensation.

Figure 2:
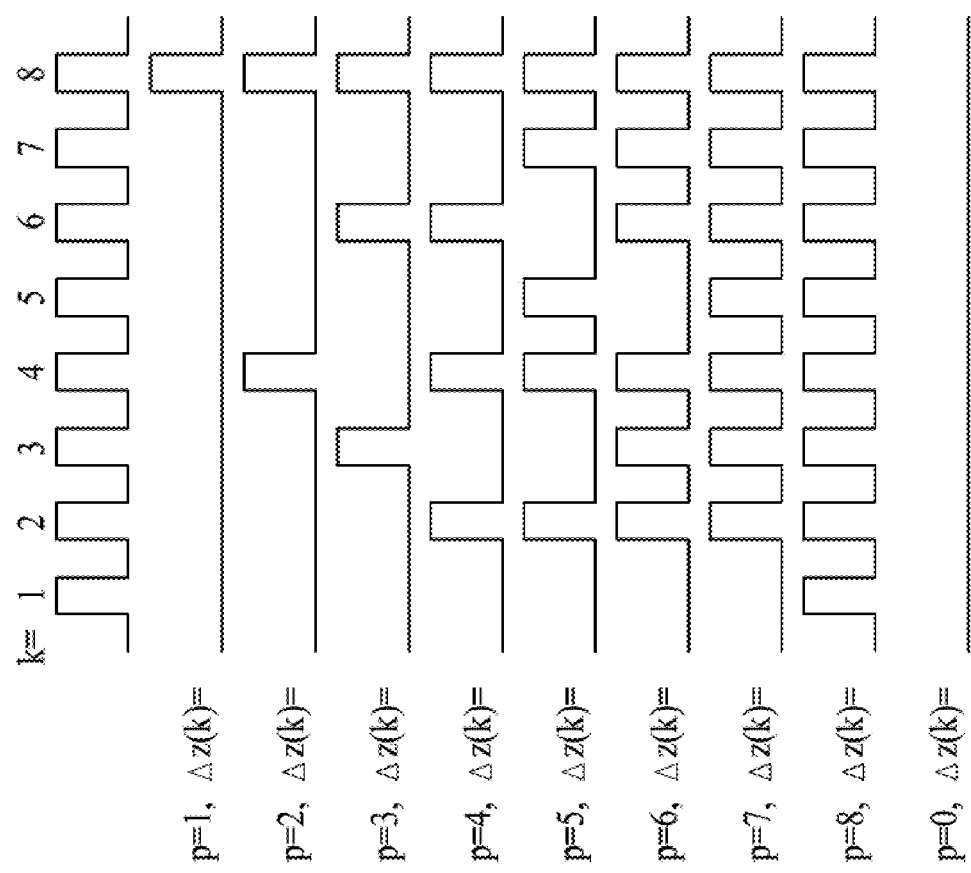
FIG. 2 is a timing diagram for error accumulation by a digital differential analyzer (DDA) algorithm in an integral control module.

Please refer to FIG. 2 for the operation of the integral control module 22:

Assume the number of clocks within each integral time is 8, the number of triggering times is k, the position error is p, the output overflow signal is $\Delta Z$, and the initial value of the remainder register 223 is $q(0)=0$;

Perform $q(k-1)+p$ (the position error p and the value in the remainder register are added up) when triggering happens;

Overflow happens such that $\Delta Z(k)=1$, $q(k)=q(k-1)+p-8$ (the position errors are accumulated by the overflow signal $\Delta Z$, and the remainder is stored in the remainder register 223) when $q(k-1)+p>8$;

Otherwise, $\Delta Z(k)=0$, $q(k)=q(k-1)+p$ (no overflow signal appears, and the remainder is stored in the remainder register 223);

Repeat the aforementioned steps. There will be p overflow signals and p output pulses when 8 times of iterance are completed. The integral control module 22 performs integration for accumulated errors with respect to each sampling clock at each DDA pulse so as to complete accumulating the position errors. The output is enhanced by accumulation so as to eliminate the steady-state error and achieve high-precision motion control. Moreover, the integral control module 22 uses a digital differential analyzer algorithm to output a pulse. Therefore, the acceleration curve is smoothed to simulate the discrete digital IC characteristics as in a continuous system to prevent abrupt augmentation of the accumulated errors within each integral time and thus achieve protection against excessive overshoot. Therefore, the instability due to oscillation of the controlled system because of improperly adjusted gain parameters and sampling cycles can be overcome.

The derivative control module 23 uses a register 231 and a subtractor 232 to perform derivative calculation by subtracting the delay of the position error within each sampling clock so as to generate a derivative of the error, which is multiplied with a derivative gain 234 by a multiplier 233 to generate a derivative compensation. The derivative compensation is input into the compensation adder 30 to improve the transient response.

The integral sampling clock and the derivative sampling clock are configured by a clock controller (not shown). Moreover, the feed-forward control module 10, the proportional control module 21, the integral control module 22 and the derivative control module 23 can be implemented using digital circuits designed by a hardware description language (HDL).

Figure 3:
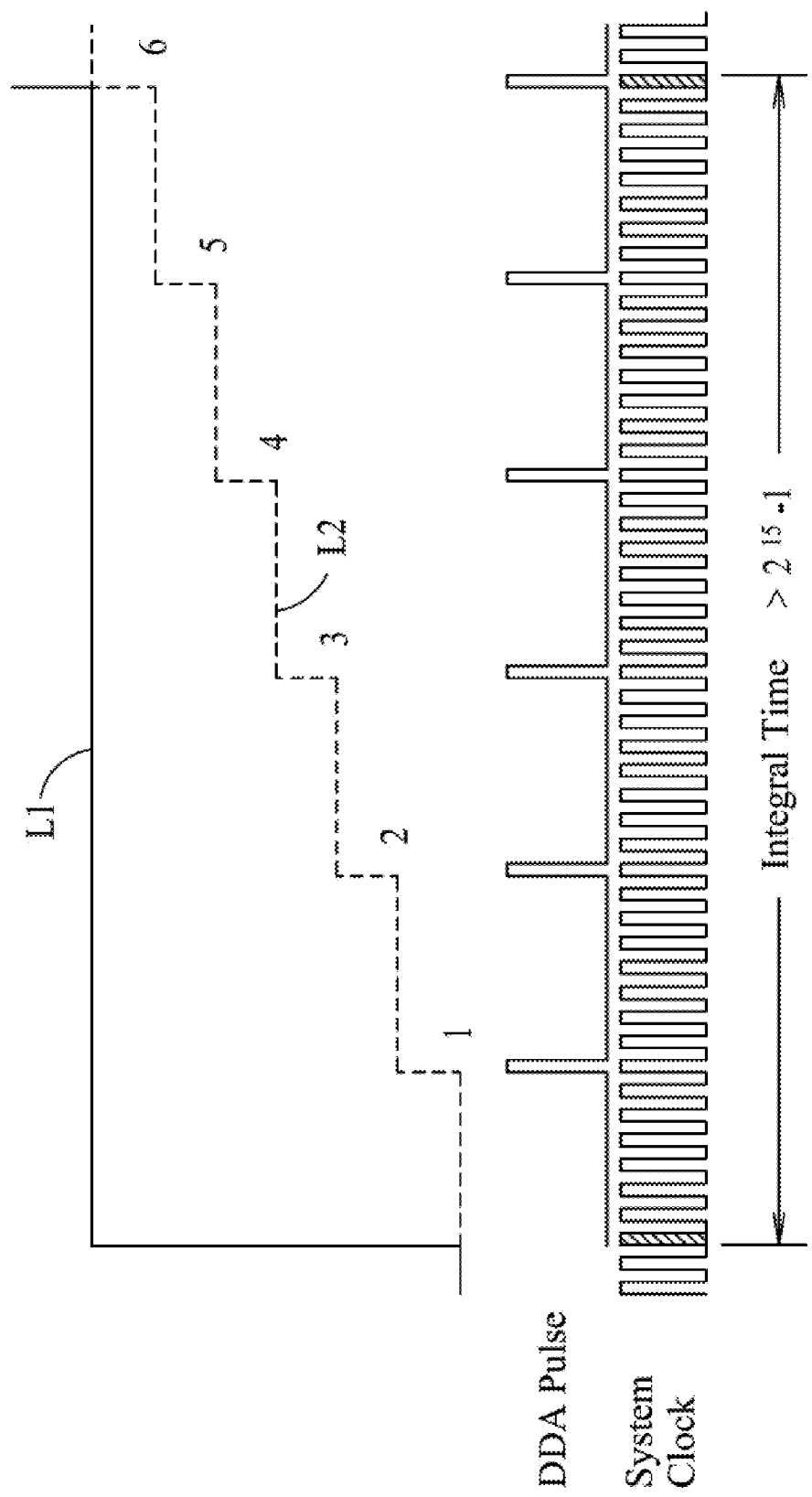
FIG. 3 shows the comparison of accumulated errors between the present invention and the conventional integral control.

Please refer to FIG. 3, which shows the comparison of accumulated errors between the present invention and the conventional integral control. Assume the value of the accumulated errors within overall integral time is 6. In the conventional integrator (without using the digital differential analyzer algorithm), all of the 6 errors are accumulated once within a single integral time, as indicated by L1 in FIG. 2. However, in the present invention, the integral control module uses DDA algorithm to accumulate position errors, the difference of the position command and the feedback command, during each integral time. More particularly, only one position error is added to the accumulated position errors for 6 integral accumulations at each DDA pulse generation within an integral time, as indicated by L2 in FIG. 3. Therefore, the abrupt augmentation of the accumulated errors within each integral time is prevented and thus protection against excessive overshoot is achieved. Moreover, the instability due to oscillation of the controlled system can be overcome and the increased output eliminates the steady-state error. As previously mentioned, in the present invention, the integral sampling clock and the derivative sampling clock are generated by a clock controller. In FIG. 3, for example, if the error counter 211 (as shown in FIG. 1) in the control loop is 16-bit, the minimum period within overall integral time is $2^{15}-1$ (32767) clocks.

According to the above discussion, it is apparent that the present invention discloses a motion control servo loop apparatus comprising a proportional-integral-derivative (PID) control loop having an integral control module using a digital differential analyzer (DDA) algorithm to enhance the response speed, eliminate the steady-state error, improve the transient response and compensate the delay of a controlled system.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A motion control servo loop apparatus, capable of compensating a position error for a motor driver, the motion control servo loop apparatus comprising:
   a feed-forward control module capable of generating a feed-forward compensation;
   a proportional-integral-derivative (PID) control loop, comprising:
      a proportional control module capable of generating a position error and processing the position error to generate an proportional compensation;
      an integral control module capable of receiving the position error and using a digital differential analyzer (DDA) algorithm to perform integration for accumulated errors with respect to each sampling clock at each DDA pulse and thus output an accumulated error, which is then processed to generate an integral compensation; and
      a derivative control module capable of receiving the position error and generating a derivative compensation at each derivative sampling clock; and a compensation adder capable of receiving the feed-forward compensation, the proportional compensation, the integral compensation and the derivative compensation to calculate a position error compensation for the motor driver.

2. The motion control servo loop apparatus as recited in claim 1, wherein the integral control module comprises:

an error command register capable of receiving the position error;

an adder capable of adding up the position error and a feedback remainder, performing a digital differential analyzer operation, and outputting an overflow signal;

an error accumulator capable of accumulating the position error to generate an accumulated error for implementing integral operations; and a remainder register capable of storing the remainder generated by the adder, and inputting the remainder into the adder to perform the digital differential analyzer operation.

3. The motion control servo loop apparatus as recited in claim 1, wherein the integral sampling frequency of the integral control module is the inverse of the period of integral time.

* * * * *